United States Patent [19]

Chenoweth

[11] 4,086,856
[45] May 2, 1978

[54] APPARATUS EMPLOYING AN INTERMEDIATE VEHICLE FOR OPERABLY INTERCOUPLING A TRACTOR OR THE LIKE WITH RAILROAD CARS

[76] Inventor: Charles E. Chenoweth, 3606 W. 30th Ter., Topeka, Kans. 66614

[21] Appl. No.: 726,987

[22] Filed: Sep. 27, 1976

[51] Int. Cl.² .............................................. B60F 1/04
[52] U.S. Cl. .................................. 105/1 A; 105/26 R; 105/26.1; 105/215 C; 105/65; 105/231; 213/75 R
[58] Field of Search .................. 105/26 R, 26.1, 90 A, 105/63, 64, 65, 73, 75, 215 C, 231, 215 R; 104/7 R, 8; 213/75 R

[56] References Cited

U.S. PATENT DOCUMENTS

| | | | |
|---|---|---|---|
| 1,158,814 | 11/1915 | Larison et al. | 105/64 R X |
| 1,393,544 | 10/1921 | Knight | 105/65 X |
| 1,561,510 | 11/1925 | Dutton | 105/215 R X |
| 3,022,744 | 2/1962 | Jackson | 105/215 C X |
| 3,196,803 | 7/1965 | Plasser et al. | 104/8 |
| 3,401,642 | 9/1968 | Fisher | 104/7 B X |
| 3,874,306 | 4/1975 | Coons et al. | 105/26 R |
| 3,980,025 | 9/1976 | Olson, Sr. et al. | 105/215 C |

*Primary Examiner*—Albert J. Makay

*Attorney, Agent, or Firm*—Schmidt, Johnson, Hovey & Williams

[57] ABSTRACT

An intermediate vehicle intercouples a tractor or the like with an ordinary railroad car for shuttling a number of railroad cars along the rails for purposes of loading, switching, and spotting of same. The intermediate vehicle is supported by rail wheels and has an ordinary railroad-type mechanical coupling on one end thereof for coupling with a railroad car, while the other end possesses a tractor-drawn-implement-type coupling for connection with an ordinary three-point hitch of the tractor. Hydraulically extendible, rail engaging wheels are fitted to the tractor for guidance thereof along the rails while the ordinary rubber driving wheels of the tractor are suitably spaced apart for traction engagement with the rails. An air compressor and reservoir mounted on the intermediate vehicle are pneumatically coupled to the air braking system of the railroad cars and to a brake control valve mounted on the tractor to allow the tractor operator to control the air brakes of the railroad cars during movement thereof. The air compressor is driven by the power-take-off of the tractor and power lift means on the tractor permit elevation of the intermediate vehicle from the rails for transport thereof along the ground to another set of rails.

22 Claims, 5 Drawing Figures

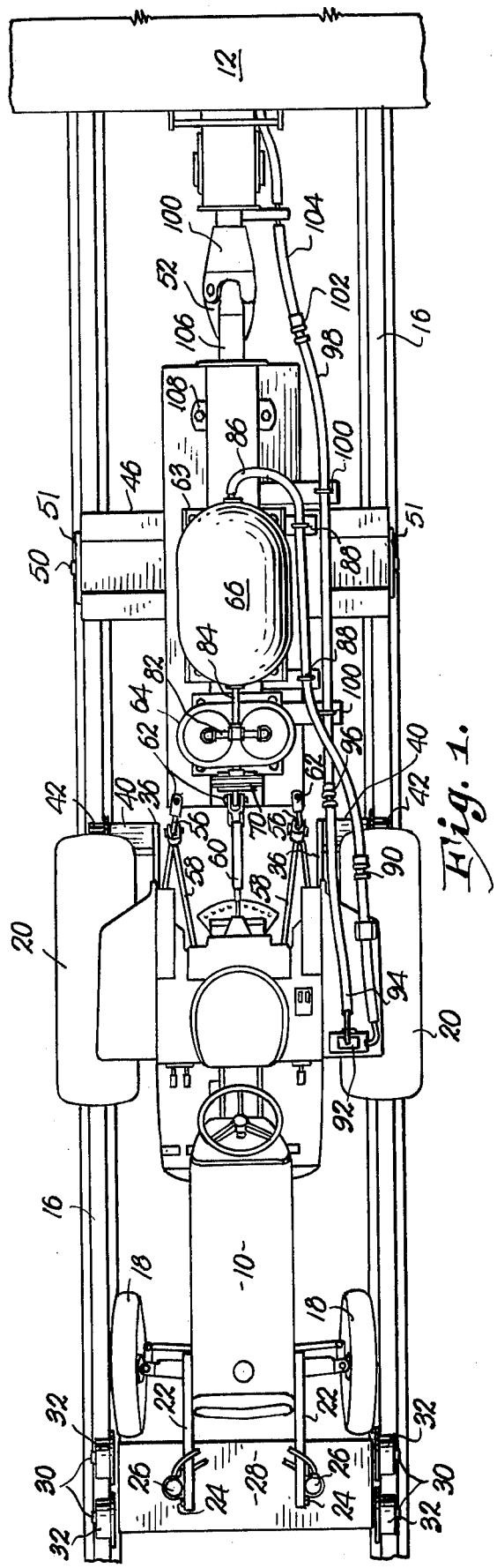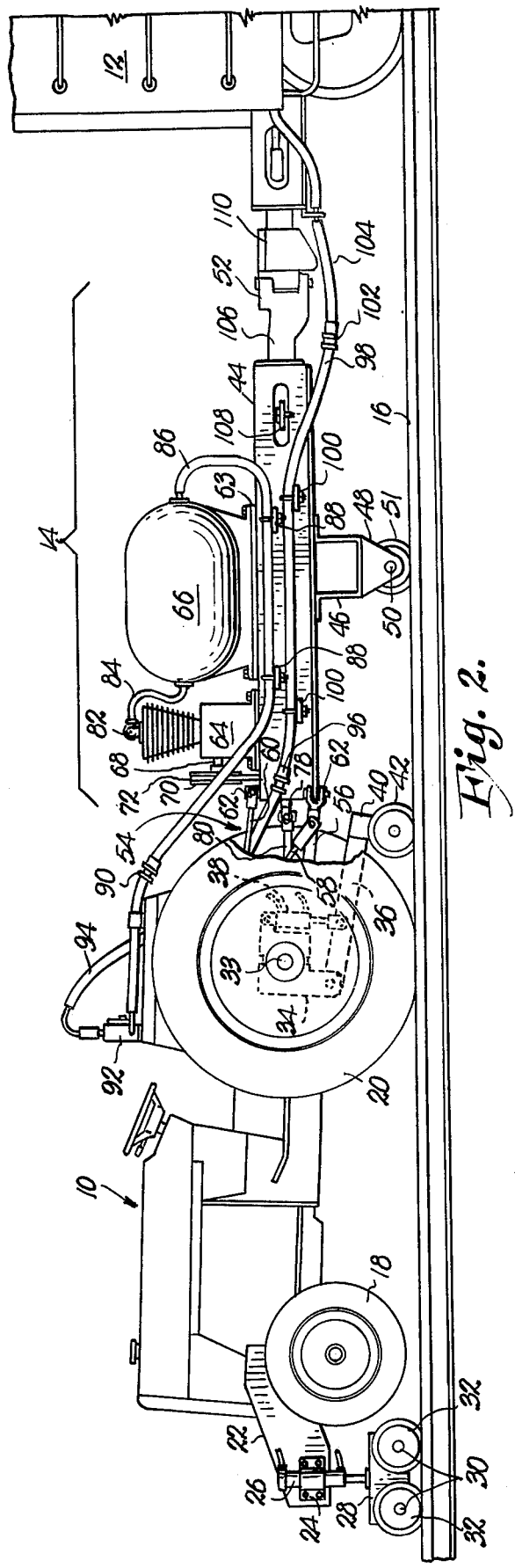

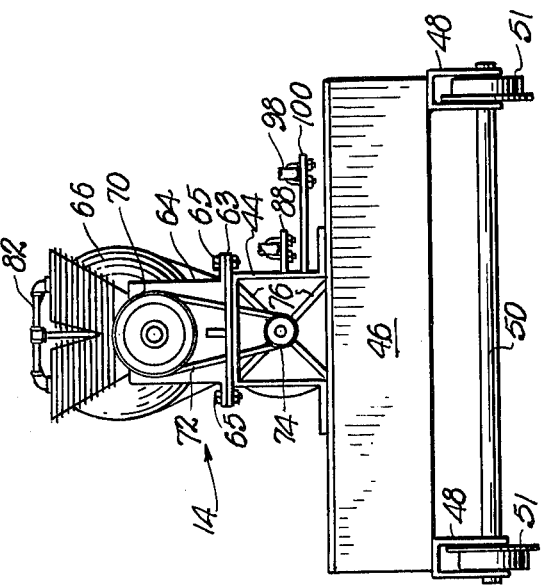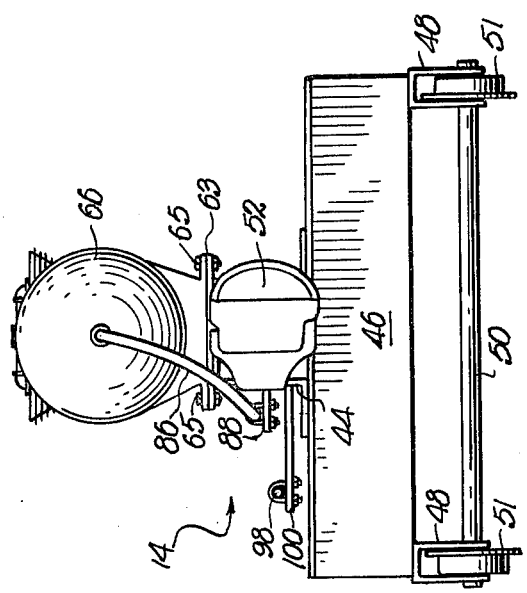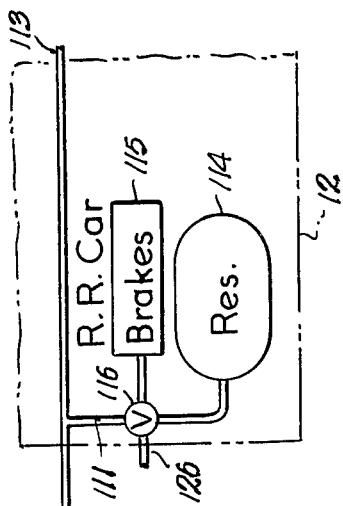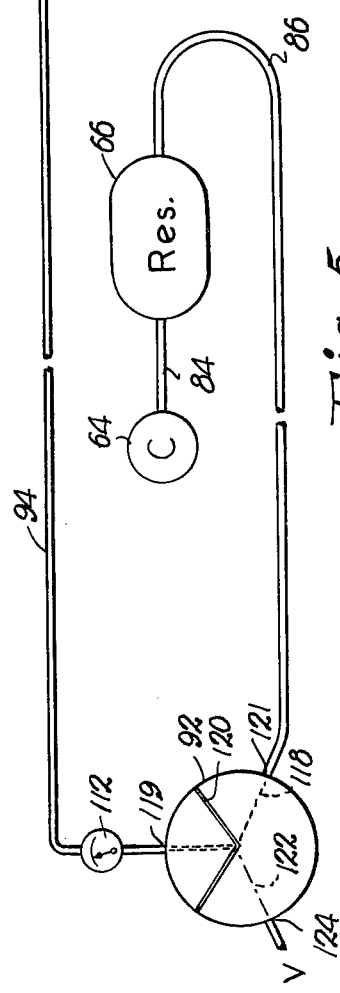

APPARATUS EMPLOYING AN INTERMEDIATE VEHICLE FOR OPERABLY INTERCOUPLING A TRACTOR OR THE LIKE WITH RAILROAD CARS

The present invention relates to apparatus for intercoupling a tractor-like draft vehicle with an ordinary railroad car, and deals more particularly with the employment of an intermediate vehicle particularly adapted to intercouple such draft vehicle with a number of railroad cars for movement of the cars along the rails.

Short distance movement of a limited number of railroad freight cars for purposes of switching, spotting, and loading is commonly required at industrial sites. Although "switch engines" are sometimes employed for car movement, such use of a full size locomotive is particularly wasteful in energy consumption and requires several trained personnel for its safe operation. Moreover, such locomotives are seldom available on a standby basis for switching operations thus preventing timely movement of freight cars and impairing the efficiency of some industrial operations. These problems are particularly prevalent in rural commercial developments as in farming operations where grain loading of freight cars at elevator sites takes place far from major rail heads. Prior art solutions to the aforementioned problems have been primarily aimed at providing a self-propelled draft vehicle, significantly smaller and more efficient than a locomotive, to couple with and transport relatively small numbers of freight cars for the short distances required. The design of some of these draft vehicles restricts their use exclusively to railroad switching operations while others of such vehicles have retractable rail wheels and rubber tire highway wheels to permit their use on ordinary roadways, but even these vehicles remain somewhat specialized respecting the field of their commercial use. One such specialized rail draft vehicle is disclosed in U.S. Pat. No. 3,874,306 to Harold L. Coons et al, issued Apr. 1, 1975, wherein an essentially truck-like vehicle suitable for highway travel is fitted with retractable rail engaging guide wheels and front and rear railcar coupling means. Although such draft vehicles may be effective for their intended purpose they are generally mechanically complicated and expensive to manufacture. Still other less expensive apparatus have been employed in the past to "shuttle" railroad cars including stationary winches, handjacks and forklifts, but these devices have generally proven unsatisfactory and rely on the handbrake of the railroad car for stopping, thus rendering them hazardous in operation.

The present invention provides a unique solution to the above mentioned problems by providing a safe and highly economical means for shuttling a relatively small number of railroad cars along the rails. The concept of an intermediate vehicle is employed to intercouple a number of railroad cars with an ordinary service vehicle such as a farm tractor. The front end of the intermediate vehicle is particularly adapted to receive and couple with the three-point-type hitch typically used by farm tractors, while the rear end is fitted with an ordinary drawbar having a standard railroad car coupling device. An air compressor, mounted on the intermediate vehicle and driven by the tractor's power-take-off, comprises an independent source of air pressure for releasing the air brakes of the railroad cars. Pneumatic hoses interconnect the railroad car, the intermediate vehicle and the tractor while a three-position control valve mounted on the tractor allows the tractor operator to selectively set or release the railroad cars' brakes. The tractor is fitted with hydraulically extendible rail engaging guide wheels to allow movement thereof along the tracks, while the intermediate vehicle is likewise carried by a pair of such guide wheels.

An important object of the invention is to provide a particularly economical and simple means for moving a number of railroad cars short distances along the rails in proximity to commercial operations, especially for purposes of loading, switching, and spotting of said cars.

Another object of the invention is to provide unique apparatus for operably intercoupling a tractor-like draft vehicle with a number of railroad cars for movement thereof along the rails.

A further object of the invention is to provide apparatus of the character described above which readily couples with existing self-propelled vehicles, thus obviating the need for highly specialized and expensive draft vehicles which have limited application beyond their use in moving railroad cars.

A still further object of the invention is to provide apparatus of the character described which includes a means for controlling the air braking system of a number of railroad cars to be moved, thus allowing safe, reliable transport of said cars.

Another object of the invention is to provide, in apparatus of the type described, a simple means for moving railroad cars short distances along the rails, safely operable by a single operator, thereby avoiding the need for multiple personnel typically required for operation of more specialized draft vehicles such as "switching engines".

A further object of the invention is to provide apparatus of the character described which is adapted for use with an ordinary farm tractor, thus permitting movement of railroad cars in rural areas as near grain elevator sidings where loading and unloading of such cars typically involves the short distance movement thereof, such car movement heretofore accomplished through the use of full scale switching engines.

In the drawings:

FIG. 1 is a plan view of a preferred embodiment of this invention, shown in operative relationship to a pair of rails and a portion of one of a number of railroad cars to be coupled with, for movement thereof along the rails.

FIG. 2 is a side elevational view of the apparatus shown in FIG. 1.

FIG. 3 is a rear elevational view of an intermediate vehicle means for coupling a number of railroad cars with a draft vehicle, which forms a part of the invention.

FIG. 4 is a front elevational view of the apparatus shown in FIG. 3.

FIG. 5 is a diagrammatic representation of a means for controlling the air braking system of an ordinary railroad car, which forms a part of the invention.

Referring initially to FIGS. 1 and 2, the general arrangement of the preferred embodiment of this invention includes a tractor or like service vehicle 10 operably coupled to one of a number of railroad cars 12 (additional railroad cars not shown) by intermediate vehicle means, generally indicated by the numeral 14, for movement of said cars along the rails 16. The tractor 10 may be of the ordinary agricultural type having front steerable wheels 18 and rear rubber driving wheels 20, the latter being laterally spaced apart a suitable distance to engage and rest upon the rails 16. Since the track width of the driving wheels of most farm tractors is adjustable, a large number of existing tractors are therefore readily adaptable for use in the preferred form of the invention.

A pair of spaced apart front rail wheel support brackets 22 are rigidly secured to the front of the tractor 10 and extend forwardly and downwardly therefrom. Mounting flanges 24, attached by bolting or welding to front support brackets 22, secure double action front hydraulic cylinders 26 therebetween for downward piston rod extension of the latter upon actuation, essentially perpendicular with respect to the rails 16. A transversely extending box-like wheel frame 28 lies substantially parallel to the rails 16 and has the top side thereof secured to the outer ends of the hydraulic cylinder 26 piston rods as by welding. Wheel frame 28 has secured in each end piece thereof a pair of laterally extending axles 30 having flanged metal guide wheels 32 mounted for rotation thereon. When hydraulic cylinders 26 are de-actuated, wheel frame 28 moves upward from the position shown in FIG. 2, thereby raising the flanged guide wheels 32 out of engagement with rails 16, while simultaneously lowering the steerable tractor wheels 18 into engagement with the ground.

Rear drive axle 33 of the tractor 10 has fixedly mounted thereon a pair of spaced apart rear wheel mounting brackets 34 (only one of same being shown in broken lines in FIG. 2). Wheel arms 36 each have one end thereof pivotally mounted on mounting bracket 34 while a central portion thereof has pivotally mounted thereto, one end of rear hydraulic cylinders 38, the other end of said hydraulic cylinders being also pivotally mounted to rear wheel mounting brackets 34. Extension members 40 are rigidly attached to the free end of wheel arms 36, and extend laterally therefrom to allow rear flanged metal guide wheels 42, whose axles are journaled in the outer ends thereof, to engage the rails 16 when said arms are in the downward extended position shown in FIG. 2. Rear flanged guide wheels 42, as well as front flanged guide wheels 32, may be 8 to 12 inches in diameter in the preferred form and are of the type having a flanged portion extending inside and between the rails 16. Rear hydraulic cylinders 38 are of double action type and it is apparent that upon a first actuation thereof, the rearward portion of the pivotally mounted wheel arms 36 will swing downwardly, placing the rear guide wheels 42 into engagement with rails 16, while a second actuation of same will draw the wheel arms 36 upwardly to retract and disengage said wheels from the rails. It is noted, however, that while front hydraulic cylinders 26 are extended sufficiently to raise steerable front wheels 18 off the ground to prevent a steering action therefrom, the rear driving wheels 20 of the tractor remain engaged with the rails 16 when rear guide wheels 42 are in their rail engaging position. With the six above described rail guide wheels maintaining the longitudinal axis of the tractor essentially central between the rails, ample traction is provided by the rail engaging rubber driving wheels 20 by virtue of the fact that: the raising of the front of the tractor shifts a portion of the weight thereof to the driving wheels; the tractor weight is distributed on the relatively narrow 2½ inch wide rails, thereby substantially increasing the loading which the tractor would otherwise exert on the full width of the ordinary tractor tires; and, the coefficient of friction of rubber tires to steel rails is substantially greater than that of steel wheels to steel rails. From the foregoing, it is also clear that the front and rear guide wheels 32 and 42 respectively may be retracted to allow the tractor 10 to operate normally over the ground and do not substantially impair the versatility of such tractor in the agricultural environment, while appropriate positioning of the tractor upon the rails and extension of said guide wheels thereto into engagement with the rails convert the tractor into a highly efficient and reliable draft vehicle for moving railroad cars along the rails.

Referring now also to FIGS. 3 and 4, intermediate vehicle means 14 has an essentially hollow structural frame comprising a first member 44 extending longitudinally, essentially horizontally parallel to the rails 16 and having a generally U-shaped cross-section with the longitudinal edges thereof terminated in an out-turned flange, and a second frame member 46 of like cross-section, extending under and traverse to said first member, substantially spanning the full width between the rails 16. First and second frame members 44 and 46 respectively, have their open sides facing each other with a portion of their respective flanged edges in contact whereat the members are rigidly joined by welding or the like, such that first frame 44 has its longitudinal axis positioned laterally approximately through the midpoint of said second frame member 46 and substantially central between the rails 16. As best seen in FIGS. 3 and 4, a pair of triangularly shaped rail wheel brackets 48, each of same having a pair of spaced apart parallel ears, are mounted as by welding on the bottom of the outermost ends of said second frame member 46, each said ear having aligned apertures therein to receive the wheel axle 50 sleeved therethrough. A metal guide wheel 51 is mounted between each pair of ears on axle 50, for rotational engagement with the rails 16, each said guide wheel also of the type having a flange portion thereof on the interior aspect of each rail for maintaining the position of said wheels thereon during movement of said intermediate vehicle 14 along said rails.

As shown in FIG. 2, the first frame member 44 of the intermediate vehicle means 14 is disposed essentially horizontally with respect to rails 16 and is releasably coupled at its rearward end by a later discussed coupler 52 to railroad car 12, while the front end thereof is releasably coupled in cantilever fashion to the tractor 10 by means of the ordinary power lift type, three-point tractor hitch, broadly designated by the numeral 54. The three-point hitch 54 comprises a pair of power links 56 with hydraulic cylinder rods 58 pivotally attached thereto, and a swingable stablizier link 60, each of said links being releasably secured to the first frame member 44 by the pin mechanisms 62.

First frame member 44 has horizontally disposed mounting plate means 63 secured to the top side thereof as by welding with air compressor 64 and air reservoir 66 in turn secured to said mounting plate means by bolts 65. Air compressor 64 is of the dual cylinder type with a capacity of approximately 12 cubic feet per minute in the preferred form, and has the input drive shaft 68 thereof projecting forwardly toward the tractor 10. Compressor drive pulley 70 is rigidly secured on the shaft 68 and is connected for driving rotation via pulley belt 72 by the power takeoff pulley 74 which is mounted for rotation on the cross-brace 76 (best seen in FIG. 4), said cross-brace in turn being secured, as by welding, internal of the hollow portion of first frame member 44. Power takeoff pulley 74 is releasably connected via pin mechanism 78 to the power takeoff drive shaft 80 of the tractor 10, which forms the power source for driving the compressor 64. Compressor 64 has a pair of outlet ports pneumatically connected by coupling pipe 82 which in turn is operably connected with one end of connecting hose 84, the other end of same forming an input to the inlet port of air reservoir 66. The air reservoir 66 has pneumatic supply hose 86 coupled to the outlet port thereof, said hose running forwardly, essentially parallel to the first frame member 44 and secured therealong by brackets and U-clamp assemblies 88 which depend laterally from one side thereof and are mounted thereto as by welding. Supply hose 86 is coupled via quick disconnect mechanism 90 to one input of the tractor mounted three-way brake control valve 92. Pneumatic air brake hose 92, likewise coupled to the control valve 94, extends rearwardly therefrom and is coupled via second quick disconnect mechanism 96 to an intermediate hose portion 98 which is secured to first frame member 44 via a second pair of laterally depending brackets and U-clamp assemblies 100 which are secured as by welding to said frame member. The intermediate portion 98 of the air brake hose is in turn coupled via a third quick disconnect mechanism 102 to the air braking system hose 104 of the railroad car 12. It is noted here that each of the above described pneumatic hoses and coupling mechanisms are of the type commonly used in connection with railroad air brake systems. In summary then, a means for supplying compressed air to the railroad car 12 is traceable from the air compressor 64 and air reservoir 66 via hose 86, valve 92 and hoses 94, 98 and 104.

The rear coupling means of intermediate vehicle 14 comprises a drawbar 106 which includes a standard railroad coupler 52 and an ordinary draft gear assembly, a portion of same visible and indicated by the numeral 108 in FIGS. 1 and 2. The draft gear assembly 108 is suitably secured internal of the rearward end of the first frame member 44 and functions to partially absorb impact communicated through coupler 52 upon coupling, uncoupling, and braking of railroad car 12. Coupler 52 is of the type which latchingly engages a mating one of same, such as the railroad car coupler 110.

From the foregoing it is evident that the intermediate vehicle means 14 is adapted to be readily and easily uncoupled from the railroad car 12 or from the tractor 10. The intermediate vehicle means 14 may be uncoupled from the tractor 10 by disconnecting both the quick disconnect mechanisms 90 and 96, and the three-point hitch 54 and power-take-off drive shaft 80 via their respective pin mechanisms, while such vehicle is simply uncoupled from the railroad car 12 by uncoupling coupler 52 and disconnecting the quick disconnect mechanism 100.

Turning attention now to FIG. 5, the primary components of the air braking system include the intermediate vehicle means mounted air compressor 64 and air reservoir 66 coupled via connecting hose 84, and the tractor mounted three-way valve 92 having an air pressure gauge 112 coupled to one port thereof. These components function, in part, to control the air braking system of railroad car 12 and additional cars (not shown) pneumatically connected to car 12 by hose 113. The braking system of each car is of the Westinghouse-type, well known in railroading, and it will suffice in the present disclosure to indicate same as including branch line 111, auxiliary reservoir 114 and brake apparatus 115, operatively connected to the valve 116. In operation, the air compressor 64 driven by the previously mentioned power-take-off of the tractor 10 delivers compressed air via hose 84 to the air reservior 66 for storage therein. Valve 92 has a main port 119, an inlet 121, and a vent port 124 and may be positioned to a first, second and third position respectively represented within the valve 92 by the broken line 118, solid line 120 and broken line 122. Valve 92 may be of the solenoid operated type, to allow quick, reliable valve control by the tractor operator, it being further recognized however that such solenoid could be remotely operated by personnel other than the tractor operator. The braking apparatus 115 is of the type which normally engages or "sets" the brakes on car 12 when the air pressure within line 111 falls below a minimum value, such value being approximately 55 psig in the present form. This method of operation provides the safety feature of automatically engaging the brakes when such car experiences pressure loss due to a leak or the like in the pneumatic brakelines or when the car is merely pneumatically uncoupled from a pressure supply source. This, prior to movement of the railroad car 12 by the combination of the tractor 10 and intermediate vehicle means 14, the brakes of car 12, as well as the brakes of any number of other railroad cars coupled thereto, are engaged and must be released prior to movement of the cars. A single operator of the tractor 10 accomplishes this necessary brake release simply and safely by placing the three-way valve 92 in the position 118 whereupon air compressed to approximately 70 psig and stored within air reservoir 66, flows via pneumatic supply hose 86 through a flow path within valve 92 coinciding with the broken line 118, thence through air pressure gauge 112 and air brake hose 94 to the railroad car 12 and more particularly through branch line 111 to the valve 116. In response to a pressure of 70 psig supplied by line 111, valve 116 is operative to place the line 111 in communication with the reservoir 114 thereby charging the latter to 70 psig, while simultaneously coupling the brake vent 126 to the brake apparatus 115 to allow compressed air stored in the latter to escape to the open atmosphere, thereby disengaging the brakes of car 12. Air pressure gauge 112 provides a means to allow the tractor operator to determine whether the brakes are engaged or disengaged, a pressure of approximately 50 psig indicating that the brakes are disengaged while a 70 psig reading indicates engagement of the brakes. During movement of the railroad cars by the tractor 10 and intermediate vehicle 14, the three-way valve 92 remains in the position 118 in order to maintain the 70 psig pressure throughout the brakelines of the railroad cars. Subsequently, in order to engage the brakes of the railroad cars for purposes of slowing or stopping the same, the operator need only switch valve 92 to position 122, whereupon hose 94 and main port 119 are coupled to the vent port 124 which is open to the atmosphere, thus allowing compressed air remaining in the brakelines of the railroad cars to flow back through hose 94 and gauge 112 to the open atmosphere. When the pressure within branch line 111 is reduced to approximately 55 psig as indicated by the gauge 112, valve 116 is actuated whereby the brake apparatus 115 is uncoupled from the brake vent 126 and is simultaneously placed in communication with reservoir 114 whereupon air stored at 70 psig in the latter flows through valve 116 to brake apparatus 115, causing the engagement of the brakes on car 12. Thus, when the brakelines are depressurized to approximately 55 psig as indicated by the gauge 112, the brakes of the railroad car 12 are engaged and remain so engaged until such time as the vehicle operator switches the valve 92 to the position 118, whereupon the railroad car brakelines may be repressurized to the 70 psig level for subsequent disengagement of the brakes and movement of the cars. Position 120 of valve 92 is provided to prevent escapement of stored compressed air within reservoir 66 to the open atmosphere when hose 94 is disconnected from a railroad car as during transport of the intermediate vehicle 14 from one set of rails to another. From the foregoing it is evident that the air control system is novelly employed to allow a single operator of the tractor 10 to safely control the braking system of a number of cars to be moved.

Turning now to an operational description of the intermediate vehicle means 14 and the associated tractor 10, it is first noted that the tractor 10 is freely movable along the ground in its normal mode of operation when the rail engaging wheels 30 and 42 are in their retracted position. Prior to moving the tractor 10 onto the rails the intermediate vehicle means 14 is coupled to the tractor 10 by means of the previously discussed pin mechanisms and quick disconnect hose connections. Recalling now that first and second frame members 44 and 46 respectively, are securely attached to each other and therefore comprise a rigid structural unit, the entire intermediate vehicle means 14 may be vertically raised, by means of the power lift three-point hitch 54, a sufficient distance to allow clearance of the guide wheels 51 from ground level, thereby allowing transport of said vehicle by the tractor 10 across the ground and onto the rails 16 for proper alignment and positioning therewith. Thus, the intermediate vehicle means 14 used in combination with a draft vehicle such as the tractor 10 provides a unique and particularly expedient means for moving from rail to rail, to shuttle railroad cars for loading, switching and the like. Prior to coupling the intermediate vehicle means 14 with a railroad car 12, the tractor operator drives the tractor onto the tracks a suitable distance forward of railroad car 12, with the intermediate vehicle means 14 in its elevated, cantilevered position, and centrally positions the tractor 10 between the rails 16 such that the driving wheels 20 rest upon said rails. The operator then actuates the front hydraulic cylinders 26 to extend the flanged guide wheels 30 into engagement with the rails 16 and raise the front end of the tractor, and hence the steerable wheels 18, off of the ground. The operator then actuates the rear hydraulic cylinders 38 to allow the rear flanged guide wheels to swing downwardly into engagement with the rails 16, however, whereas front guide wheels 30 may carry substantial weight of the tractor 10, the rear guide wheels 41 do not carry such substantial weight, but merely provide a guiding function for keeping the rear driving wheels 20 in traction alignment with the rails 16. The tractor 10 having been thus conditioned for operational movement along the rails, the operator then actuates the three-point power lift hitch 54 to lower the same and thereby place the intermediate vehicle means 14, and more particularly the rail guide wheels 51 thereof into engagement with the rails 16. The tractor and intermediate vehicle means having been driven onto the rails 16 substantially forward of the railroad car 12, it thus remains for the operator to back the tractor rearwardly to allow engagement of the coupler 52 with the railroad car coupler 110, and upon the completion of such coupling the operator need only couple the hoses 98 and 104 via quick disconnect mechanism 100 to enable control of the air braking system of railroad car 12 and thus complete the necessary coupling with railroad car 12 for movement thereof along the rails 16. The above described procedure is carried out in reverse in order to uncouple the intermediate vehicle means 14 from the railroad car 12 and transport said vehicle to another set of rails to perform subsequent switching operations with other railroad cars.

It will be observed that my improved apparatus not only provides for the reliable accomplishment of the object of the invention, but does so in a relatively simple and economical manner. It is recognized, of course, that those skilled in the art may make various modifications or additions to the preferred embodiment chosen to illustrate the invention without departing from the gist and essence of my contribution to the art. Accordingly, it is to be understood that the protection sought and to be afforded hereby should be deemed to extend to the subject matter claimed and all equivalents thereof fairly within the scope of the invention.

I claim:

1. In apparatus for operably intercoupling a self-propelled tractor-like draft vehicle with a conventional railroad car supported on a pair of rails for movement of the latter along said rails, said draft vehicle having steerable wheels and at least a pair of driving wheels suitable to permit movement thereof over the ground and further having at one end thereof conventional tractor-type three-point hitch mechanical coupling means, said railroad car having at each end thereof conventional railway-type mechanical coupling means incompatible with said tractor-type mechanical coupling means on said draft vehicle:
    intermediate vehicle means adapted to be disposed between said draft vehicle and said railroad car and having wheel means for movably supporting the same on said rails;
    tractor-drawn-implement-type mechanical coupling means on said intermediate vehicle adjacent one extremity thereof and of type compatible with said coupling means on said draft vehicle for mechanically coupling the latter with said intermediate vehicle; and
    conventional railway-type mechanical coupling means on said intermediate vehicle adjacent the opposite extremity thereof and of type compatible with said coupling means on said railroad car for mechanically coupling the latter to said intermediate vehicle.

2. The invention of claim 1, wherein:
    said intermediate vehicle means includes a frame having a first member extending longitudinally, substantially parallel with said rails, and having said tractor-drawn-implement-type coupling means and said railway-type coupling means respectively connected to the opposite ends thereof,
    said frame having a second member joined to said first member and extending transversely thereof,
    said wheel means being secured to said second member.

3. The invention of claim 2, wherein:
    said wheel means comprise a pair of spaced rail-engaging wheels.

4. The invention of claim 1, wherein:
    a power means is mounted on said draft vehicle operable for selectively raising or lowering said intermediate vehicle means; and
    conventional tractor-type coupling means are mounted on said draft vehicle for connecting said power means with said intermediate vehicle means and swingably mounting the latter in cantilever fashion from said draft vehicle for vertical movement, upon actuation of said power means, onto and off of said rails.

5. In apparatus for operably intercoupling a self-propelled tractor-like draft vehicle with a conventional railroad car supported on a pair of rails for movement of the latter along said rails, said draft vehicle having steerable wheels and at least a pair of driving wheels suitable to permit movement thereof over the ground and further having at one end thereof conventional tractor-type mechanical coupling means, said railroad car having at each end thereof conventional railway-type mechanical coupling means incompatible with said tractor-type mechanical coupling means on said draft vehicle:

intermediate vehicle means adapted to be disposed between said draft vehicle and said railroad car and having wheel means for movably supporting the same on said rails;

tractor-drawn-implement-type mechanical coupling means on said intermediate vehicle adjacent one extremity thereof and of type compatible with said coupling means on said draft vehicle for mechanically coupling the latter with said intermediate vehicle;

conventional railway-type mechanical coupling means on said intermediate vehicle adjacent the opposite extremity thereof and of type compatible with said coupling means on said railroad car for mechanically coupling the latter to said intermediate vehicle;

a power means mounted on said draft vehicle operable for selectively raising or lowering said intermediate vehicle means; and conventional tractor-type coupling means mounted on said draft vehicle for connecting said power means with said intermediate vehicle means and for swingably mounting the latter from said draft vehicle for vertical movement upon actuation of said power means, said conventional tractor-type coupling means comprising a three-point hitch having a pair of power links and a stablizer link removably attached to said intermediate vehicle means and operable to selectively raise or lower the latter upon actuation of said power links.

6. The invention of claim 1, wherein:
certain of said driving wheels of said draft vehicle are laterally spaced apart a distance corresponding to the spacing of said rails for traction engagement therewith and including, first flanged guide wheels mounted on said draft vehicle and positioned for rail engagement adjacent said steerable wheels;

second flanged guide wheels mounted on said draft vehicle and positioned for rail engagement adjacent said driving wheels; and means mounted on said draft vehicle and operatively connected to said first and second flanged guide wheels for selectively moving the latter into or out of engagement with said rails.

7. The invention of claim 6, wherein:
said flanged guide wheel moving means include first hydraulically operated extendible motor members associated with engaging movement of said first flanged guide wheels; and said flanged guide wheel moving means further includes second hydraulically operated extendible motor members associated with engaging movement of said second flanged guide wheels, said first and second extendible motor members being remotely actuatable by an operator of said draft vehicle, and said first extendible motor member being sufficiently extendible upon actuation thereof to raise said adjacent steerable wheels out of engagement with the ground.

8. The invention of claim 1, wherein:
said railway-type mechanical coupling means includes an elongated drawbar having draft gear connected to one end thereof and a conventional coupler connected to the other end, said drawbar extending longitudinally, essentially parallel to said rails and centrally positioned therebetween.

9. The invention of claim 8, wherein:
said intermediate vehicle means includes an essentially hollow frame member extending longitudinally along said rails, centrally positioned therebetween, and a portion of said draft gear of said draw bar is secured to said frame member within one end of the latter.

10. In apparatus as set forth in claim 1 for intercoupling a draft vehicle further having air control means thereon and air conduit means coupled with said control means and terminating at said one end of said draft vehicle in quick disconnect-type air coupling means, with a railroad car having a conventional railway-type air braking system thereon and air conduit means coupled with said system and terminating at said one end of said car in conventional quick disconnect-type railway air coupling means, wherein is provided:

air conduit means on said intermediate vehicle having terminations adjacent each of said extremities of said intermediate vehicle;

air coupling means at the termination of said conduit means on said intermediate vehicle adjacent said one extremity of the latter compatible with said air coupling means on said draft vehicle for pneumatically coupling said air control means on the latter with said air conduit means on said intermediate vehicle; and air coupling means at the termination of said conduit means on said intermediate vehicle adjacent said opposite extremity of the latter compatible with said railway-type air coupling means on said railroad car for pneumatically coupling said air braking system on the latter with said air conduit means on said intermediate vehicle.

11. In apparatus as set forth in claim 10 for interconnecting a draft vehicle having air control means of the kind including a main port, a pressure inlet port, a vent port and means for selectively placing said main port in communication with said inlet port or said vent port, wherein is provided:

means for supplying compressed air, pneumatically coupled to said air conduit means on said intermediate vehicle and operable for supplying compressed air through said latter conduit means to said pressure inlet port of said air control means, and further operable to supply compressed air through said air conduit means on said intermediate vehicle to said air braking system of said railroad car when said main port is placed in communication with said inlet port.

12. The invention of claim 11, wherein:
said means for supplying compressed air includes an air reservoir means for storing a quantity of compressed air, provided with an inlet port to receive air for storage therein and having an outlet port pneumatically coupled to said air conduit means on said intermediate vehicle.

13. The invention of claim 12, including:
a means for compressing air, having a drive input and further having an outlet port thereof pneumatically coupled to said inlet port of said air reservoir means, and operable, when energized, to deliver compressed air to the latter.

14. The invention of claim 13, wherein:
said air reservoir means and said means for compressing air are mounted on said intermediate vehicle means for movement along said rails.

15. The invention of claim 14, wherein:
power-take-off driving means are provided on said draft vehicle, operably coupled to the drive input of said means for compressing air, and selectively operable to drive the latter to produce compressed air.

16. In apparatus for moving a number of railroad cars along a pair of supporting rails, each said car being of the type employing a railway-type air braking system and a conventional railway-type mechanical coupling at each end thereof:
a tractor or like vehicle having steerable wheels and at least a pair of driving wheels for movement over the ground, and further having at one end thereof conventional tractor-type three-point hitch mechanical coupling means;
intermediate vehicle means adapted to be disposed between said tractor and one of said railroad cars, and having wheel means for movably supporting the same on said rails;
tractor-drawn-implement-type mechanical coupling means on said intermediate vehicle adjacent one extremity thereof and of type compatible with said coupling means on said tractor for mechanically coupling the latter with said intermediate vehicle means;
conventional railway-type mechanical coupling means on said intermediate vehicle means adjacent the opposite extremity thereof and of type compatible with said coupling means on said one railroad car for mechanically coupling the latter to said intermediate vehicle means; and
compressed air supply means, pneumatically coupled with said braking system of said number of railroad cars, and selectively controllable for operation of the latter.

17. The invention of claim 16, wherein:
said intermediate vehicle means includes a frame having a first member extending longitudinally substantially parallel with said rails and having said tractor-drawn-implement-type coupling means and said railway-type coupling means respectively connected to the opposite ends thereof;
said frame has a second member joined to said first member and extending transversely thereof; and
said wheel means are secured to said second frame member.

18. In apparatus for moving a number of railroad cars along a pair of supporting rails, each said car being of the type employing a railway-type air braking system and a conventional railway-type mechanical coupling at each end thereof:
a tractor or like vehicle having steerable wheels and at least a pair of driving wheels for movement over the ground, and further having at one end thereof conventional tractor-type mechanical coupling means;
intermediate vehicle means adapted to be disposed between said tractor and one of said railroad cars, and having wheel means for movably supporting the same on said rails;
tractor-drawn-implement-type mechanical coupling means on said intermediate vehicle adjacent one extremity thereof and of type compatible with said coupling means on said tractor for mechanically coupling the latter with said intermediate vehicle means;
conventional railway-type mechanical coupling means on said intermediate vehicle means adjacent the opposite extremity thereof and of type compatible with said coupling means on said one railroad car for mechanically coupling the latter to said intermediate vehicle means; and
compressed air supply means, pneumatically coupled with said braking system of said number of railroad cars, and selectively controllable for operation of the latter,
said tractor including a three-point power type hitch provided with a pair of power links and a stablizer link removably attached to said tractor-drawn-implement-type coupling of said intermediate vehicle means, and operable to selectively raise or lower the latter upon actuation of said power links.

19. The invention of claim 16, wherein:
said tractor driving wheels are adapted for lateral spacing thereapart a distance corresponding to the width spacing between said rails for traction engagement therewith, and including
first flanged guide wheels mounted on said tractor and positioned adjacent said steerable wheels;
second flanged guide wheels mounted on said tractor and positioned adjacent said driving wheels; and
means operatively connected to said first and second flanged guide wheels for selectively moving same into or out of engagement with said rails.

20. The invention of claim 19, wherein:
said flanged guide wheel moving means include hydraulically operated extendible motor members associated with said first and second flanged guide wheels respectively, said extendible motor members being remotely actuatable by an operator of said tractor and, said extendible motor members associated with said first flanged guide wheels being sufficiently extendible upon actuation thereof to raise said adjacent steerable wheels out of engagement with the ground.

21. The invention of claim 16, wherein:
said compressed air supply means includes a means for storing a quantity of compressed air, a means for producing compressed air having an input drive, and a valve means for controlling the flow of compressed air, said producing means operably coupled to said storing means and operable to deliver compressed air to the latter for storage therein, said valve means pneumatically coupled to said storing means and to said braking system and operable to selectively regulate the flow of compressed air into and from said braking system for control thereof.

22. The invention of claim 21, wherein:
said means for producing compressed air and said compressed air storing means are mounted on said intermediate vehicle means; and
said tractor is provided with a power-take-off, said power-take-off being operably coupled with the input drive of said means for producing compressed air and selectively operable to drive the latter to produce compressed air.

* * * * *